United States Patent [19]

Sparhawk

[11] Patent Number: 5,538,098
[45] Date of Patent: Jul. 23, 1996

[54] MAGNETICALLY CONTROLLED RETRACTOR

[75] Inventor: John B. Sparhawk, Royal Oak, Mich.

[73] Assignee: TRW Vehicle Safety Systems Inc., Lyndhurst, Ohio

[21] Appl. No.: 444,149

[22] Filed: May 18, 1995

[51] Int. Cl.$^6$ .................................................. B60R 21/00
[52] U.S. Cl. ........................................ 180/270; 280/806
[58] Field of Search ............................... 180/268, 270; 280/806

[56] References Cited

U.S. PATENT DOCUMENTS

| | | | |
|---|---|---|---|
| 3,952,966 | 4/1976 | Burleigh | 242/107.4 R |
| 4,136,328 | 1/1979 | Cambern | 180/270 |
| 4,345,665 | 8/1982 | Föhl | 180/270 |
| 4,895,317 | 1/1990 | Rumpf et al. | 242/107.4 R |
| 4,896,742 | 1/1990 | Shitanoki et al. | 180/270 |
| 5,165,498 | 11/1992 | Garboli et al. | 180/268 |

*Primary Examiner*—Kenneth R. Rice
*Attorney, Agent, or Firm*—Tarolli, Sundheim, Covell, Tummino & Szabo

[57] ABSTRACT

A device (10) has a spool (20) for storing a seat belt (28) wound on the spool (20). The spool (20) is rotatable about an axis (22) in belt withdrawal (A) and belt retraction (B) directions. A ratchet wheel (24) is fixed for rotation with the spool (20). A movable pawl (32) has a blocking position for blocking the ratchet wheel (24) and the spool (20) against rotation in the belt withdrawal direction (A) and a release position for permitting rotation of the ratchet wheel (24) and the spool (20) in the belt withdrawal direction (A). A permanent magnet (46) is attached to the pawl (32) for movement with the pawl (32). A control means (30) controls movement of the permanent magnet (46) and the pawl (32) between the release and blocking positions. The magnetic control means (30) includes a first magnetic biasing means (58) for biasing the permanent magnet (46) and the pawl (32) toward the blocking position. The magnetic control means (30) also includes a second magnetic biasing means (52) for biasing the permanent magnet (46) and the pawl (32) toward the release position. The second magnetic biasing means (52) is preferably an electromagnet, and the flow of electrical energy to the electromagnet is controlled by an actuator mechanism (60) that may include an inertia sensor assembly (62) and a timer (86).

22 Claims, 3 Drawing Sheets

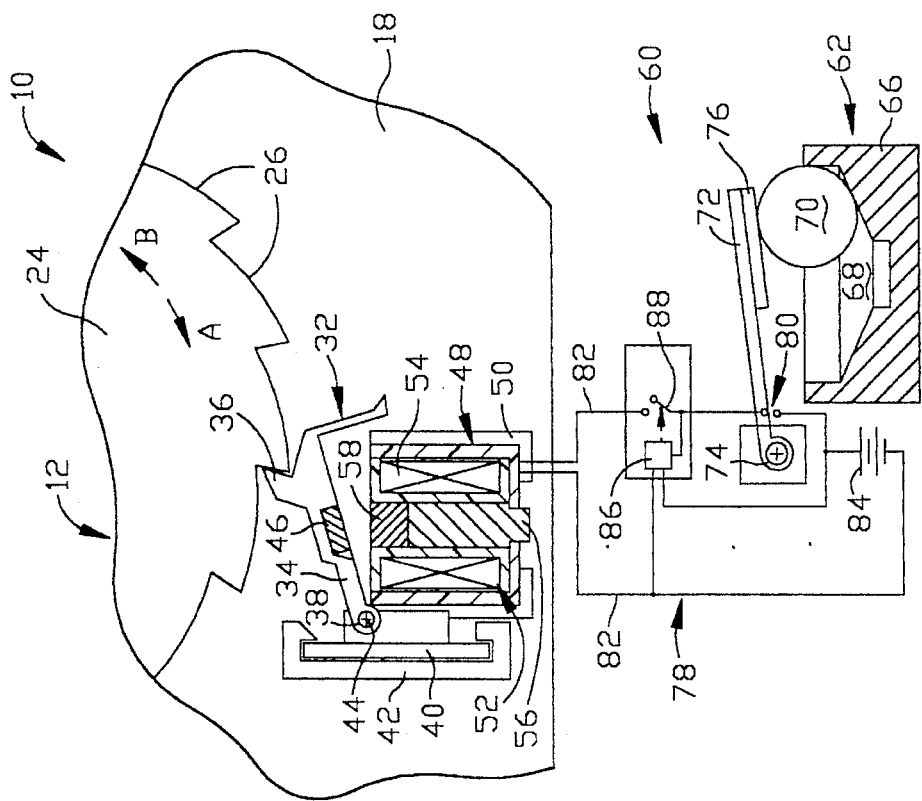
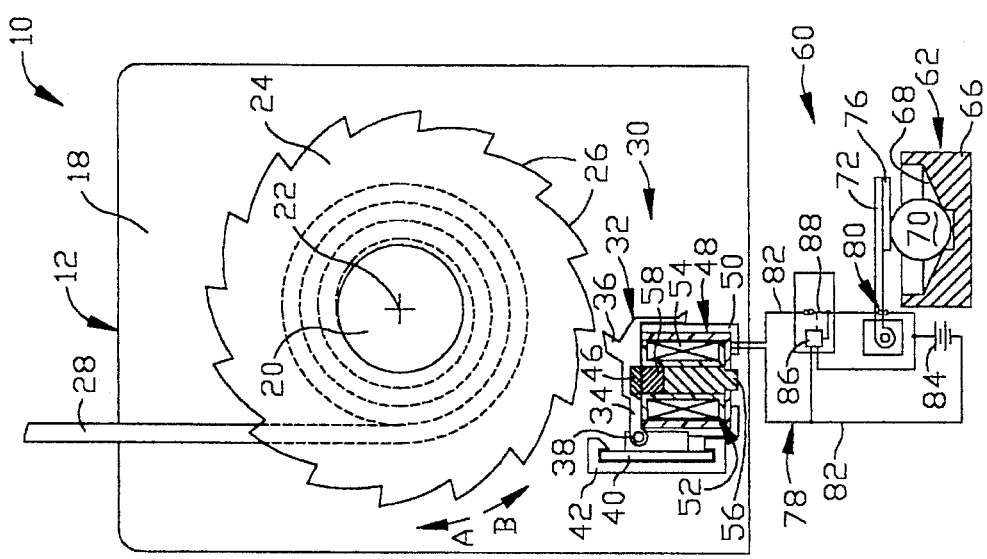
FIG. 2
FIG. 1

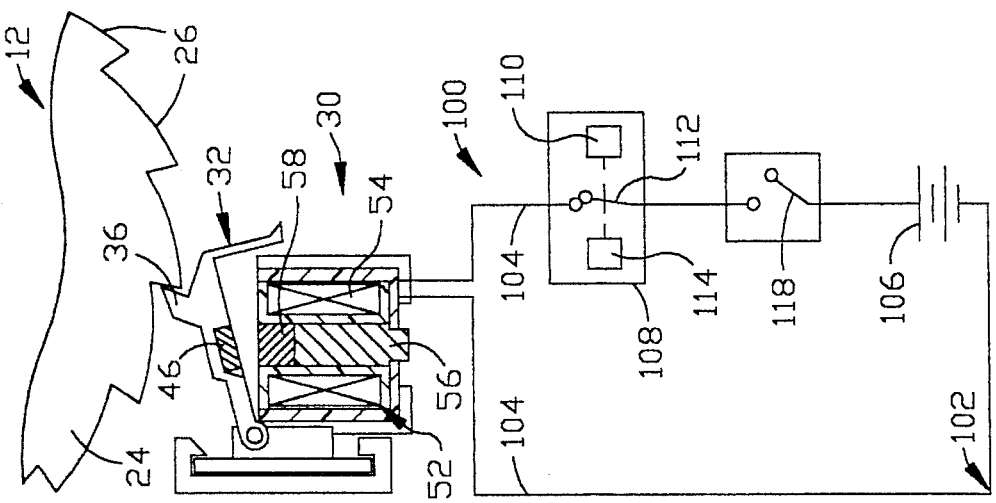
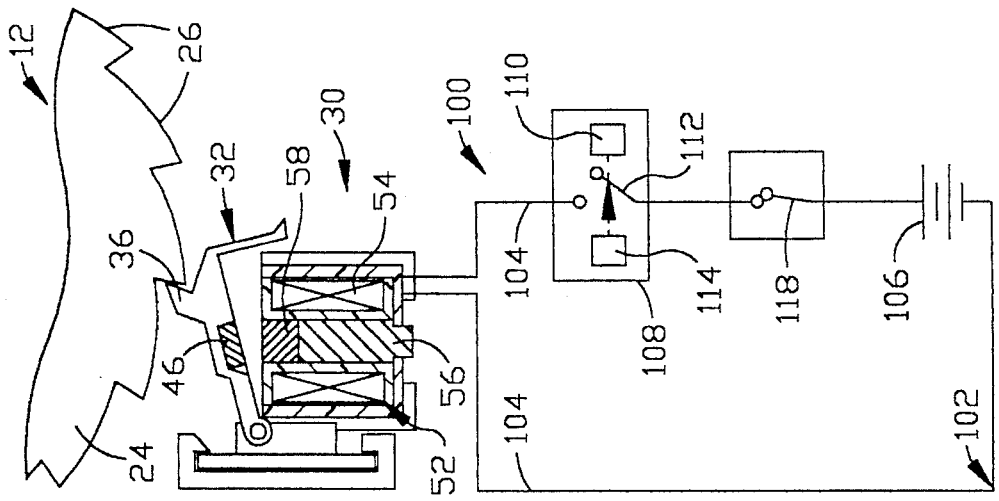
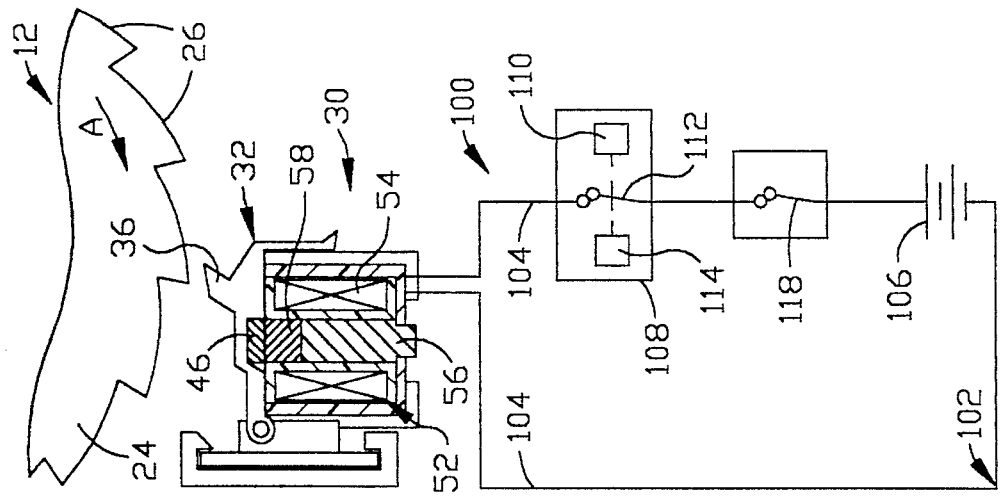

MAGNETICALLY CONTROLLED RETRACTOR

BACKGROUND OF THE INVENTION

The present invention relates to a vehicle seat belt retractor device for use in a vehicle occupant restraint system. In particular, the present invention relates to a vehicle seat belt retractor which has a mechanism for blocking rotation of a seat belt storage spool in a seat belt withdrawal direction.

One known seat belt retractor is disclosed in U.S. Pat. No. 4,895,317, to Rumpf. This retractor includes an electrical mechanism for controlling movement of a retractor member which blocks rotation of a retractor spool in a belt withdrawal direction. The electrical mechanism includes a permanent magnet mounted on the retractor member, and an electromagnet which creates a magnetic field. When the electromagnet is energized, the magnetic field of the electromagnet causes movement of the permanent magnet and the retractor member.

SUMMARY OF THE INVENTION

The present invention relates to a seat belt retractor device which includes a spool means for storing a seat belt wound on the spool means. The spool means is rotatable about an axis in belt withdrawal and belt retraction directions. A ratchet wheel is fixed for rotation with the spool means. A movable pawl means has a blocking position for blocking the ratchet wheel and the spool means against rotation in the belt withdrawal direction. The pawl means has a release position for permitting rotation of the ratchet wheel and said spool means in the belt withdrawal direction.

The device includes a permanent magnet attached to the pawl means for movement with the pawl means. A magnetic control means controls movement of the permanent magnet and the pawl means between the release and blocking positions. The magnetic control means includes a first magnetic biasing means for biasing the permanent magnet and the pawl means toward the blocking position. The magnetic control means includes a second magnetic biasing means for biasing the permanent magnet and the pawl means toward the release position.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic illustration of a first embodiment of the present invention, with parts in a first position;

FIG. 2 is an enlargement of a portion of the embodiment shown in FIG. 1, with certain parts in a second position;

FIG. 3 is a schematic illustration of a second embodiment of the present invention, with certain parts in a first position;

FIGS. 4 and 5 are illustrations similar to FIG. 3, with certain parts in second and third positions, respectively;

DESCRIPTION OF PREFERRED EMBODIMENT

Figure 6:
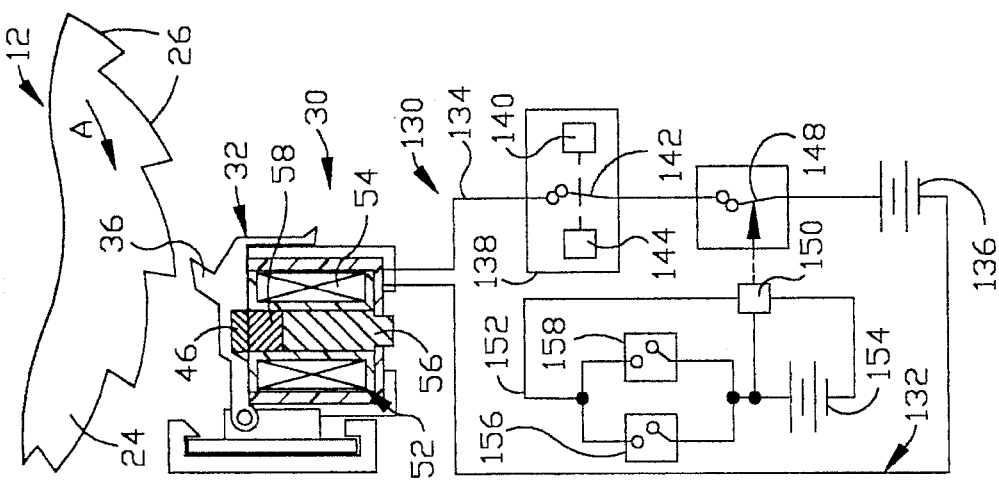
FIG. 6 is a schematic illustration of a third embodiment of the present invention, with certain parts in a first position.

This invention relates to a vehicle seat belt retractor device. The device may be of many different constructions. As representative of the present invention, a device 10 which includes a seat belt retractor 12 is schematically illustrated in FIG. 1.

The retractor 12 has a metal frame 18, which is adapted to be fixed to a portion of a vehicle (not shown), and a seat belt storage spool 20, which is rotatable about an axis 22 relative to the frame 18. Two metal locking ratchet wheels 24 (only one shown) are fixed for rotation with the spool 20. Each of the ratchet wheels 24 has an annular array of sloped teeth 26. A length of seat belt 28 is wound on the spool 20. An end of the seat belt 28 is attached to the spool 20, in a known manner.

The spool 20 and the ratchet wheels 24 are rotatable in a seat belt withdrawal (unwinding) direction A and a seat belt retraction (winding) direction B. A rewind spring (not shown) acts between the frame 18 and the spool 20 to bias the spool 20 and the ratchet wheels 24 to rotate in the belt retraction direction B, as is known. An actuatable control mechanism 30 of the device 10 provides a means for preventing rotation of the spool 20 and the ratchet wheels 24 in the belt withdrawal direction A. The actuatable mechanism 30 includes a pawl or lever 32 which has a mount end portion 34 and a free end portion 36.

The pawl 32 is pivotally connected to a pivot pin 38 at the mount end portion 34. The pivot pin 38 extends from a support plate 40 which is held in a support bracket 42. The support bracket 42 is fixed relative to the frame 18 of the retractor 12. Thus, the free end portion 36 of the pawl 32 is pivotable relative to the frame 18 about an axis 44 (FIG. 2) extending along the pivot pin 38.

The pawl 32 is pivotable between a release position (FIG. 1), wherein the free end portion 36 is not in engagement with the ratchet wheels 24, and a blocking position (FIG. 2), wherein the free end portion 36 is in engagement with the ratchet wheels 24. When the pawl 32 is in the release position (FIG. 1), rotation of the spool 20 and the ratchet wheels 24 in the belt withdrawal direction A is permitted. When the pawl 32 is in the blocking position (FIG. 2) rotation of the spool 20 and the ratchet wheels 24 (only a fragment is shown in FIG. 2) in the withdrawal direction A is prevented.

The pawl 32 is illustrated as being directly engageable with both, or even only one, of the ratchet wheels 24. However, it will be understood that an intermediate mechanism may be disposed between the pawl 32 and the ratchet wheels 24 such that upon pivoting of the pawl 32, the intermediate mechanism is activated and the intermediate mechanism causes blocking of the ratchet wheels 24 in the belt withdrawal direction A. For example, such an intermediate mechanism is disclosed in U.S. Pat. No. 4,895,317, which is assigned to the assignee of the present invention.

A permanent magnet 46 is attached to the pawl 32, intermediate the mount end portion 34 and the free end portion 36. The permanent magnet 46 is fixed to the pawl 32 in a suitable manner, such as by an adhesive bond. The permanent magnet 46 is preferably made of a relatively light material, such as ceramic, to minimize the pivoting mass of the pawl 32.

A magnetic mechanism 48 (FIG. 1) of the actuatable mechanism 30 causes pivoting of the pawl 32 between its release and blocking positions. The magnetic mechanism 48 is mounted adjacent to the pawl 32 in a support bracket 50.

The support bracket 50 is fixed relative to the frame 18. When the pawl 32 is in its release position, the pawl 32 is located relatively near to or in direct contact with the magnetic mechanism 48. When the pawl 32 is in its blocking position (FIG. 2), the pawl 32 is located relatively away from the magnetic mechanism 48.

The magnetic mechanism 48 includes an electromagnet 52. The electromagnet 52 has wire coils 54 (shown schematically) wound about a core member 56. Preferably, the wire coils 54 are made of a highly conductive material, such as copper. Also preferably, the core member 56 is made of a ferrous material. When electrical energy flows through the wire coils 54, a magnetic force field is established.

The magnetic force field created by the electromagnet 52 creates a force which acts upon the permanent magnet 46 to cause movement of the permanent magnet 46 and thus the pawl 32. The polarities of the permanent magnet 46 and the electromagnet 52 are such that when the electromagnet 52 is energized and its magnetic field acts upon the permanent magnet 46, the permanent magnet 46 is biased toward the electromagnet 52. Thus, the permanent magnet 46 and the pawl 32 are biased by the electromagnet 52 toward the release position (FIG. 1) when the electromagnet 52 is energized.

The magnetic mechanism 48 also includes a permanent magnet 58. The permanent magnet 58 is located atop the core member 56 and within a portion of the windings of the wire coils 54. Thus, the permanent magnet 58 can be considered part of the core of the electromagnet 52.

The permanent magnet 58 is positioned relatively near the permanent magnet 46, such that when the pawl 32 is in its release position, the permanent magnet 46 attached to the pawl 32 engages, or nearly engages, the permanent magnet 58. The proximity of the permanent magnets 46 and 58 ensures that the magnetic force field provided by the permanent magnet 58 acts upon the permanent magnet 46.

The permanent magnets 46 and 58 are oriented such that the permanent magnets 46 and 58 are repulsive to each other. Thus, the magnetic force from the permanent magnet 58 biases the permanent magnet 46 upward away from the magnetic mechanism 48, such that the pawl 32 is biased toward its blocking position (FIG. 2). When the electromagnet 52 is not energized, the repulsive force between the permanent magnet 46 and the permanent magnet 58 is sufficiently large to bias the pawl 32 into its blocking position. However, the magnetic force created by the electromagnet 52 is sufficiently large to overcome the repulsive force between the permanent magnet 46 and the permanent magnet 58 such that the pawl 32 is moved to its release position away from the ratchet wheels 24 when the electromagnet 52 is energized.

The magnet force from the electromagnet 52 is not strong enough to reverse the permanent magnetic fields created by the permanent magnets 46 and 58. In other words, the electromagnet 52 does not cause either the permanent magnet 46 or the permanent magnet 58 to change its respective properties. Nonetheless, the pawl 32 remains in its release position (FIG. 1) so long as the electromagnet 52 is energized with electrical energy.

An actuator mechanism 60 of the device 10 controls a flow of electrical energy to the wire coils 54 of the electromagnet 52. The actuator mechanism 60 may be of many different constructions and may be operated in many different manners. As representative, a first embodiment (FIGS. 1 and 2) of the actuator mechanism 60 includes an inertia sensor assembly 62, which reacts to a change in vehicle inertia.

A change in the inertia of the vehicle corresponds to a change in acceleration/deceleration of the vehicle in any of several directions, including forward, rearward, lateral and tip over directions, which may occur in a vehicle collision. The several types of changes in acceleration/deceleration are referenced herein collectively as changes in vehicle inertia.

The inertia sensor assembly 62 itself may be of different constructions, may be operated in different manners, and may be located in different vehicle locations. As representative, the inertia sensor assembly 62 includes a support cup 66 which is fixed relative to the vehicle. The support cup 66 has a tapered recess 68 which is an upward facing concavity. The tapered recess 68 may be shaped such that the concavity is either conical, ellipsoidal, or semi-spherical.

An inertia ball 70 is located on the tapered recess 68 of the support cup 66. The ball 70 is made of a relatively high density material, such as steel. The ball 70 has a rest position (FIG. 1) at a lowest portion of the tapered recess 68. The ball 70 remains in its rest position until a change in vehicle inertia above a predetermined amount occurs. When the ball 70 rolls from its rest position, the ball 70 rolls radially outward (FIG. 2) from its rest position and also rolls upward along the tapered recess 68.

A lever 72 is mounted on a pivot pin 74 adjacent to the support cup 66. The lever 72 is pivotable relative to the support cup 66 and the ball 70. A pressure pad 76 is located on the lever 72 at the distal end portion (i.e., the end away from the pivot pin 74) and rests on top of the ball 70. When the ball 70 moves from its rest position, the ball 70 moves the pressure pad 76 upward and pivots the lever 72 upward.

An electrical circuit 78 (schematically illustrated) of the actuator member 60 includes two connection lines 82 which extend between a power source 84 and the wire coils 54 of the electromagnet 52. The power source 84 may be the battery of the vehicle.

A switch 80 (schematically illustrated) is located in the electrical circuit 78 along one of the connection lines 82. When the switch 80 is closed, electrical energy may flow between the power source 84 and the electromagnet 52 along the connection lines 82. The switch 80 is associated with the lever 72. The switch 80 is closed when the ball 70 is in its rest position and the lever 72 is in its lowest pivot position (FIG. 1). The switch 80 is opened when the ball 70 rolls from its rest position and the lever 72 is pivoted upwardly (FIG. 2). Thus, the switch 80 is closed until the occurrence of a change in vehicle inertia above the predetermined amount.

In addition, a timer 86 is provided which has an associated switch 88 located in the electrical circuit 78 along one of the connection lines 82. The timer 86 and its switch 88 provide a means for maintaining an interruption in the flow of electrical energy along the connection lines 82 according to a predetermined timing schedule. The timing schedule includes a time duration (period of time) of the interruption. When the switch 88 is closed, electrical energy may flow between the power source 84 and the electromagnet 52 along the connection lines 82.

The switches 80 and 88 are in series. The operation of the timer 86 is responsive to the opening of the switch 80, which is sensed by a change in the electrical energy flowing along the connection lines 82 (e.g., current or voltage drop). Thus, the switch 88 is usually closed.

During operation, when a vehicle occupant enters the stationary vehicle, the ball 70 is at its rest position (FIG. 1) at the lowest portion of the tapered recess 68. The lever 72 is in its lowest position and the switch 80 is closed. The timer 86 has not been activated and thus the switch 88 is also closed.

The electrical circuit 78 between the power source 84 and the wire coils 54 of the electromagnet 52 is complete and electrical energy flows along the connection lines 82 between the power source 84 and the wire coils 54. The electrical energy energizes the coils 54 of the electromagnet 52 such that the electromagnet 52 produces its magnetic field. The magnetic field of the electromagnet 52, which has a greater force than the repulsive force between the permanent magnets 46 and 58, attracts the permanent magnet 46.

The overall effect is that the pawl 32 is biased and held downward in its release position (FIG. 1), away from the ratchet wheels 24. Thus, the spool 20 and the ratchet wheels 24 can be rotated in the withdrawal direction. This permits withdrawal of the seat belt 28 from the retractor 12. The seat belt 28 is withdrawn and secured across the vehicle occupant.

The electromagnet 52 holds the pawl 32 in the release position (FIG. 1) until the occurrence of a change in vehicle inertia above the predetermined amount. In response to this change in vehicle inertia, the ball 70 rolls upward along the tapered recess 68 away from its rest position. The lever 72 is pivoted upwardly (FIG. 2), and the switch 80 is opened. This interrupts the flow of electrical energy between the power source 84 and the coils 54 of the electromagnet 52.

The electromagnet 52 is de-energized, and the magnetic force field created by the electromagnet 52 ceases. Thus, only the repulsive force between the permanent magnets 46 and 58 remains. This repulsive force pivots the pawl 32 upwardly to its blocking position (FIG. 2), in engagement with the ratchet wheels 24. Upon an attempted rotation of the spool 20 and the ratchet wheels 24 in the belt withdrawal direction A, the teeth 26 of the ratchet wheels 24 engage the pawl 32 such that rotation of the ratchet wheels 24 and the spool 20 is blocked. Further withdrawal of the seat belt 28 from the retractor 12 is prevented. Thus, the vehicle occupant is restrained.

Also, the opening of the switch 80 causes the timer 86 to activate and open the switch 88. This provides a second break in the circuit 78 and a second interruption of the electrical energy between the power source 84 and the coils 54 of the electromagnet 52. The timer 86 retains the switch 88 in its open position for a predetermined length of time (e.g., a length of time greater than the duration of a collision) so that the spool remains blocked against rotation for the predetermined length of time. Further, if the vehicle experiences electrical interruption, such as a battery failure, no electrical energy will flow between the power source 84 and the electromagnet 52. The pawl 32 moves to its blocking position, and withdrawal of the seat belt 28 is prevented.

As an alternative (not shown), a master switch (not shown) is located in the electrical circuit 78. The master switch is in series with the switches 80 and 88 and provides a break in the circuit 78 in response to a condition independent of a change in vehicle inertial.

For example, the master switch may be associated with a sensor mechanism (not shown) for detecting when the vehicle occupant is seated in the vehicle seat associated with the device 10. This sensor mechanism may include a weight sensor or an optical proximity sensor. During operation, the master switch remains open and the electromagnet 52 remains de-energized until the vehicle occupant is seated. Once the vehicle occupant is seated, the master switch is closed and the operation of the actuator mechanism 60 is as described above. Electrical energy may flow along the circuit 78 between the power source 84 and the electromagnet 58.

Also, for example, the master switch may be associated with a sensor mechanism (not shown) for detecting when a vehicle door is unlocked. During operation, this sensor mechanism causes the master switch to be open until the door is unlocked. When the door is unlocked, e.g., to permit entry of the vehicle occupant, the master switch closes such that electrical energy may flow between the power source 84 and the electromagnet 52. When the door is locked the master switch is opened, the electromagnet 52 is de-energized and further withdrawal of the seat belt 28 is prevented.

Likewise, for example, the master switch may be associated with a sensor mechanism (not shown) for detecting when a vehicle door is open. During operation, this sensor mechanism causes the master switch to be open until the door is open. When the door is open, the master switch closes such that electrical energy may flow between the power source 84 and the electromagnet 52. When the door is closed the master switch is opened, the electromagnet 52 is de-energized and further withdrawal of the seat belt 28 is prevented.

A second embodiment of the present invention is schematically illustrated in FIGS. 3–5. The second embodiment includes a retractor 12 (only a fragment is shown in FIGS. 3–5) and an actuatable mechanism 30 which are identical or substantially similar to the retractor 12 and the actuatable mechanism 30 of the first embodiment. Thus, the retractor 12 and the actuatable mechanism 30 of the second embodiment are not described in detail and similar reference numerals are used to identify similar structure.

In the second embodiment, an actuator mechanism 100 controls a flow of electrical energy to the wire coils 54 of the electromagnet 52. The actuator mechanism 100 includes an electrical circuit 102 (schematically illustrated). The electrical circuit 102 is comprised of connection lines 104 which extend between a power source 106 and the wire coils 54 of the electromagnet 52. The power source 106 may be the battery of the vehicle. When electrical energy flows along the connection lines 104 between the power source 106 and the wire coils 54, the electromagnet 52 is energized and the pawl 32 is held in its release position (FIG. 3). When the flow of electrical energy is interrupted, the electromagnet 52 is de-energized, and the repulsive force of the permanent magnets 46 and 58 causes the pawl 32 to be biased to its blocking position (FIGS. 4 and 5).

An inertia sensor/timer assembly 108 (schematically illustrated) is located in the electrical circuit 102 along one of the connection lines 104. The inertia sensor/timer assembly 108 includes an inertia sensor assembly 110 (schematically illustrated) which may be identical to the inertia sensor assembly 62 (FIG. 2) of the first embodiment or may be of other design. The inertia sensor assembly 110 (FIG. 3) controls operation of a switch means 112 for interrupting the flow of electrical energy along the electrical circuit 102 in response to a change in vehicle inertia above a predetermined amount (FIG. 4).

The inertia sensor/timer assembly 108 includes a timer 114 (schematically illustrated) which also controls operation of the switch means 112, for interruption of electrical energy along the electrical circuit 102 in accordance with a predetermined timing schedule. The timer 114 may be of construction similar to the timer 86 (FIG. 2) of the first embodiment or may be of other design. The timing schedule includes a time duration (period of time) of the interruption.

The switch means 112 (FIG. 3) contains one or more switches, each of which has an open position and a closed position. The switch means 112 may be of construction similar to the switches 80 and 88 (FIG. 2) of the first embodiment. The switch means 112 (FIG. 3) does not interrupt the flow of electrical energy until the occurrence of a change in vehicle inertia above the predetermined amount.

The actuator mechanism 100 includes a manual switch 118 located along one of the connection lines 104 of the electrical circuit 102. The manual switch 118 and the switch means 112 are in series. Thus, the switch means 112 and the associated structure of the inertia sensor/timer assembly 108 always provides a means to interrupt the flow of electrical energy to the electromagnet 52.

The manual switch 118 provides a means for manual, selective interruption of the flow of electrical energy along the connection lines 104 between the power source 106 and the wire coils 54 of the electromagnet 52. Specifically, the manual switch 118 has a closed position (FIG. 3) in which electrical energy may flow between the power source 106 and the wire coils 54 to energize the electromagnet 52. The manual switch 118 has an open position (FIG. 5) to interrupt the flow of electrical energy to the wire coils 54 and de-energize the electromagnet 52. This causes the permanent magnet 46 to be biased only by the repulsive force between the permanent magnet 46 and the permanent magnet 58. Thus, the pawl 32 is biased upward and held in its blocking position to prevent rotation of the spool 20 and the ratchet wheels 24 in the belt withdrawal direction A.

The manual switch 118 can be located on or adjacent an associated seat, in a glove box of the vehicle, or any other effective location. Further, a diagnostic and/or indicator display (not shown) to relay information about the condition of the manual switch 118 to an operator of the vehicle could be located on an instrument panel.

During operation, when the manual switch 118 is closed (FIG. 3), the second embodiment operates in a manner similar to the first embodiment (FIGS. 1 and 2). When a vehicle occupant enters the stationary vehicle, the switch means 112 (FIG. 3) does not interrupt the flow of electrical energy and the pawl 32 is in its release position such that the spool 20 and the ratchet wheels 24 are permitted to rotate in the belt withdrawal direction A. The seat belt 28 is withdrawn from the retractor 12 and secured across the vehicle occupant. Upon the occurrence of a change in vehicle inertia above the predetermined amount, the switch means 112 is opened (FIG. 4) and the electromagnet 52 is de-energized such that the pawl 32 blocks rotation of the ratchet wheels 24 and the spool 20 in the belt withdrawal direction A. The vehicle occupant is restrained in a manner similar to the operation of the first embodiment.

The second embodiment can be operated in a manually controlled cinch mode. During operation within the cinch mode, a vehicle occupant or an article (i.e., an approved child seat) is located within the stationary vehicle. Initially, the switch means 112 and the manual switch 118 are closed and do not interrupt the flow of electrical energy, and the electromagnet 52 remains energized.

After a length of the seat belt 28 is withdrawn and secured across the vehicle occupant or article, the manual switch 118 is opened (FIG. 5). Opening the manual switch 118 interrupts the flow of electrical energy to the electromagnet 52 such that the pawl 32 is moved to its blocking position under the repulsive bias of the permanent magnets 46 and 58. Thus, further amounts of the seat belt 28 can not be withdrawn from the retractor 12. The vehicle occupant or the article is secured in place during the operation of the vehicle. The seat belt 28 may be retracted while the manual switch 118 is open.

Specifically, the spool 20 and the ratchet wheels 24 may rotate in the belt retraction direction B even though the pawl 32 is in engagement with the ratchet wheels 24. This is due to the shape of the teeth 26 of the ratchet wheels 24. Each tooth 26 has a slope which tapers radially outward. As the ratchet wheels 24 are rotated in the belt retraction direction B, the pawl 32 rides along the slope and is cammed radially outward relative to the ratchet wheel 24 against the bias of the repulsive force between the permanent magnets 46 and 58.

As each tooth 26 is rotated past the free end portion 36 of the pawl 32, the repulsive force between permanent magnets 46 and 58 pivots the pawl 32 upward into the bottom of the next tooth 26. Thus, a new locking point is established to prevent withdrawal of the seat belt 28. However, if the spool 20 and the ratchet wheels 24 continue to be rotated in the belt retraction direction B, the pawl 32 will be cammed outward by each successive tooth 26.

Figure 7:
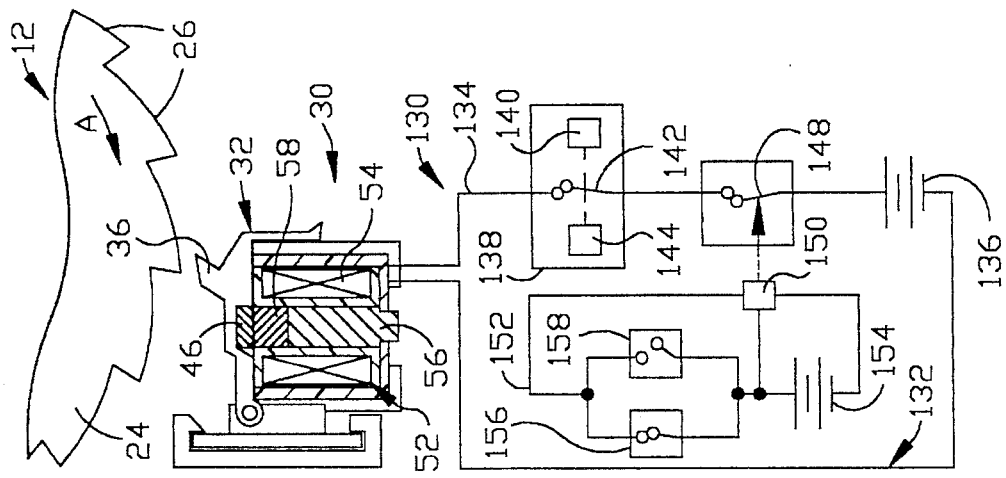
FIGS. 7 and 8 are illustrations similar to FIG. 6, with certain parts in second and third positions, respectively.
Figure 8:
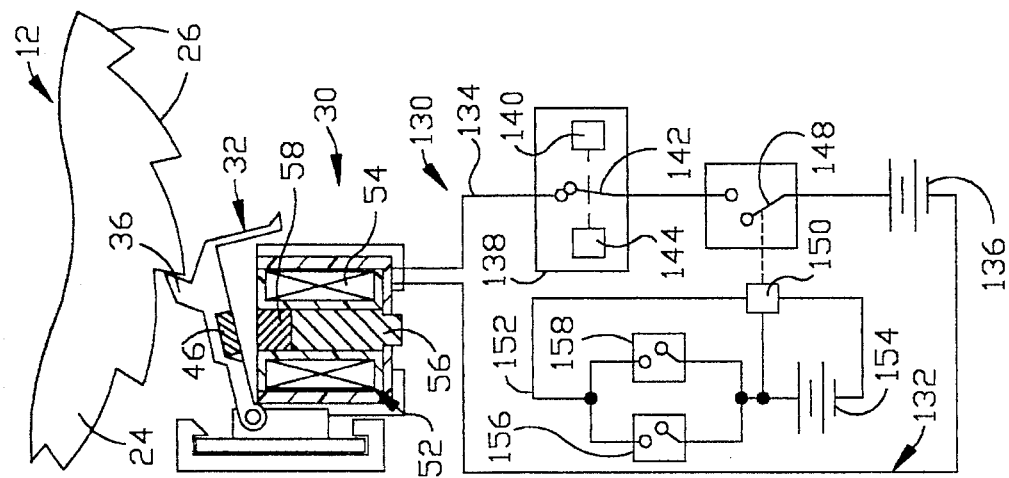

A third embodiment of the present invention is schematically illustrated in FIGS. 6–8. The third embodiment includes a retractor 12 (only a fragment is shown in FIGS. 6–8) and an actuatable mechanism 30, which are identical or substantially similar to the retractor 12 and the actuatable mechanism 30 of the first embodiment. Thus, the retractor 12 and the actuatable mechanism 30 of the third embodiment are not described in detail and similar reference numerals are used to identify similar structure.

In the third embodiment, an actuator mechanism 130 controls a flow of electrical energy to the wire coils 54 of the electromagnet 52. The actuator mechanism 130 includes an electrical circuit 132 (schematically illustrated). The electrical circuit 132 is comprised of connection lines 134 which extend between a power source 136 and the wire coils 54 of the electromagnet 52. The power source 136 may be the battery of the vehicle.

When electrical energy flows along the connection lines 134 between the power source 136 and the wire coils 54, the electromagnet 52 is energized, and the pawl 32 is held in its release position (FIGS. 7 and 8). When the flow of electrical energy is interrupted, the electromagnet 52 is de-energized, and the repulsive force of the permanent magnets 46 and 58 results in the pawl 32 being biased to its blocking position (FIG. 6).

An inertia sensor/timer assembly 138 (schematically illustrated) is located in the electrical circuit 132 along one of the connection lines 134. The inertia sensor/timer assembly 138 includes an inertia sensor assembly 140 (schematically illustrated) which may be identical to the inertia sensor assembly 62 (FIG. 2) of the first embodiment or may be of other design. The inertia sensor assembly 140 (FIG. 6) controls operation of a switch means 142 for interrupting the flow of electrical energy along the electrical circuit 132 in response to a change in vehicle inertia above a predetermined amount.

The inertia sensor/timer assembly 138 includes a timer 144 (schematically illustrated) which also controls operation of the switch means 142, for interrupting the flow of electrical energy according to a predetermined timing schedule. The timer 144 may be of similar construction to the timer 86 (FIG. 2) of the first embodiment or may be of other design. The timing schedule includes a time duration (period of time) of the interruption.

The switch means 142 contains one or more switches, each of which has an open position and a closed position. The switch means 142 may be of construction similar to the switches 80 and 88 (FIG. 2) of the first embodiment. The switch means 142 does not interrupt the flow of electrical energy until the occurrence of a change in vehicle inertia above the predetermined amount.

The actuator mechanism 130 (FIG. 6) includes a timer controlled switch 148 located along one of the connection lines 134 of the electrical circuit 132. The timer controlled switch 148 and the switch means 142 are in series. Thus, the switch means 142 and the associated structure of the inertia sensor/timer assembly 138 always provide a means to interrupt the flow of electrical energy to the electromagnet 52.

The timer control switch 148 interrupts flow of electrical energy along the connection lines 134 in response to control from a timer 150. The timer 150 is part of a control circuit 152 which operates the timer 150 in response to one or more vehicle conditions. The control circuit 152 includes a power source 154 which may be the same power source as 136.

One or more vehicle condition activated switches are located on the control circuit 152 for providing an electrical control signal to the timer 150. These vehicle condition activated switches may be of varying number and varying configuration. As representative of the present invention, the vehicle condition activated switches include a door activated switch 156 (schematically illustrated) and an ignition activated switch 158 (schematically illustrated), located in parallel on the control circuit 152.

The door activated switch 156 is open when all of the doors of the vehicle are closed. The door activated switch 156 closes when any of the doors is opened. With the door activated switch 156 closed, the control circuit 152 is completed, and an electrical energy signal flows from the power source 154 to the timer 150. The timer 150 closes the timer controlled switch 148 (FIG. 7) such that electrical energy may flow between the power source 136 and the wire coils 54 of the electromagnet 52. Assuming the switch means 142 remains closed, the pawl 32 is moved downward away from the ratchet wheels 24 to its release position.

The timer 150 holds the timer controlled switch 148 closed for a predetermined length of time (FIG. 8). Thus, even after the door which was opened is subsequently closed, the pawl 32 remains in its release position. This allows a vehicle occupant who is entering a vehicle to be seated in a vehicle seat and close the door. The vehicle occupant may then withdraw a length of the seat belt 28 from the retractor 12 and secure the seat belt 28. After the predetermined duration of time, the timer 150 may permit the timer control switch 148 to move to its open position and thus cause the pawl 32 to move to its blocking position (FIG. 6).

However, the ignition activated switch 158, which is in parallel with the door activated switch 156, also controls the electrical energy signal provided to the timer 150. Specifically, when the vehicle ignition is off, the ignition activated switch 158 is opened. When the vehicle ignition is turned on, the ignition activated switch 158 is closed and an electrical energy signal is provided to the timer 150 through the ignition activated switch 158.

Here also, the timer 150 causes the timer control switch 148 to close such that the pawl 32 is moved to and held in its release position. As long as the vehicle ignition remains on, the ignition activated switch 158 remains closed. Thus, the lever 32 remains in its release position. This permits freedom of movement for the vehicle occupant while the seat belt 28 remains secured across the occupant.

When the vehicle is parked and the vehicle ignition is turned off, the ignition activated switch 158 opens. The timer 150 holds the timer controlled switch 148 closed for a predetermined length of time. When all of the vehicle condition switches, i.e, the door activated switch 156 and the ignition activated switch 158, are open, and the timer 150 has timed out, the timer control switch 148 is open such that the pawl 32 is in its blocking position (FIG. 6). Thus, the actuator mechanism 130 of the third embodiment can be considered to retain the pawl 32 in a normally blocking position.

From the above description of the invention, those skilled in the art will perceive improvements, changes and modifications. Such improvements, changes and modifications within the skill of the art are intended to be covered by the appended claims.

Having described the invention, the following is claimed:

1. A device comprising:
   spool means for storing a seat belt wound on said spool means, said spool means being rotatable about an axis in belt withdrawal and belt retraction directions;
   a ratchet wheel fixed for rotation with said spool means;
   movable pawl means having a blocking position for blocking said ratchet wheel and said spool means against rotation in the belt withdrawal direction and a release position for permitting rotation of said ratchet wheel and said spool means in the belt withdrawal direction;
   a permanent magnet attached to said pawl means for movement with said pawl means; and
   magnetic control means for controlling movement of said permanent magnet and said pawl means between the release and blocking positions, said magnetic control means including a first magnetic biasing means for biasing said permanent magnet and said pawl means toward the blocking position, and a second magnetic biasing means for biasing said permanent magnet and said pawl means toward the release position.

2. A device as set forth in claim 1, wherein said first magnetic biasing means includes a permanent magnet, said permanent magnet of said first magnetic biasing means and said permanent magnet attached to said pawl means being first and second permanent magnets, respectively.

3. A device as set forth in claim 2, wherein said second permanent magnet is relatively near to said first permanent magnet when said pawl means is in the release position and said second permanent magnetic is relatively far from said first permanent magnet when said pawl means is in the blocking position.

4. A device as set forth in claim 3, wherein said first and second permanent magnets are oriented to provide a magnetic repulsive force between them.

5. A device as set forth in claim 1, wherein said second magnetic biasing means includes an electromagnet.

6. A device as set forth in claim 5, wherein said permanent magnet is relatively near to said first and second magnetic biasing means when said pawl means is in the release position, said permanent magnet is relatively far from said first and second magnetic biasing means when said pawl means is in the blocking position.

7. A device as set forth in claim 5, wherein said electromagnet of said second magnetic biasing means provides an attractive force between said permanent magnet and said electromagnet when said electromagnet is energized.

8. A device as set forth in claim 1, wherein said first magnetic biasing means provides a first magnetic biasing force for acting upon said permanent magnet and said second magnetic biasing means provides a second magnetic biasing force for acting upon said permanent magnet, said second magnetic biasing force being greater than said first magnetic biasing force.

9. A device as set forth in claim 8, wherein said first magnetic biasing means constantly provides said first magnetic biasing force, said second magnetic biasing means providing said second magnetic biasing force in response to at least one predetermined vehicle condition.

10. A device as set forth in claim 9, including means for sensing a change in vehicle inertia greater than a predetermined amount, and means for causing said second magnetic biasing means to provide said second magnetic biasing force until the change in vehicle inertia.

11. A device as set forth in claim 9, including vehicle switch means for causing said second magnetic biasing means to provide said second magnetic biasing force.

12. A device as set forth in claim 11, wherein said vehicle switch means is manually actuatable.

13. A device as set forth in claim 9, including means for causing said second magnetic biasing means to provide said second magnetic biasing force in response to a change in the status of a vehicle door lock.

14. A device as set forth in claim 13, including timer means for controlling said second magnetic biasing means to provide said second magnetic biasing force according to a predetermined timing schedule.

15. A device as set forth in claim 9, including means for causing said second magnetic biasing means to provide said second magnetic biasing force in response to a change in the status of a vehicle engine ignition.

16. A device as set forth in claim 15, including timer means for controlling said second magnetic biasing means to provide said second magnetic biasing force according to a predetermined timing schedule.

17. A device as set forth in claim 1, wherein said first magnetic biasing means includes a permanent magnet, said second magnetic biasing means includes an electromagnet, said permanent magnet of said first magnetic biasing means and said permanent magnet attached to said pawl means being first and second permanent magnets, respectively.

18. A device as set forth in claim 17, wherein said electromagnet includes a core and windings extending about said core, said first permanent magnet being a portion of said core.

19. A device as set forth in claim 18, including electrical connector means connected to said windings for providing electrical energy to said windings, and switch means along said electrical connector means for selectively conducting and interrupting the electrical energy.

20. A device as set forth in claim 19, wherein said switch means includes inertia switch means for interrupting the electrical energy in response to a change in vehicle inertia greater than a predetermined amount.

21. A device as set forth in claim 20, wherein said switch means includes manual switch means for interrupting the electrical energy in response to a manual input.

22. A device as set forth in claim 20, wherein said switch means includes vehicle operation switch means for interrupting the electrical energy in response to at least one predetermined vehicle operation condition.

* * * * *